United States Patent [19]
Zammit et al.

[11] Patent Number: 5,412,492
[45] Date of Patent: May 2, 1995

[54] ELECTRO-OPTICAL LENS ASSEMBLY

[75] Inventors: Theodore Zammit, Ambler; Niel Mazurek, Huntingdon Valley, both of Pa.

[73] Assignee: Magnascreen Corporation, Pittsburgh, Pa.

[21] Appl. No.: 788,029

[22] Filed: Nov. 5, 1991

[51] Int. Cl.$^6$ .......................... G02F 1/13; G08G 1/095
[52] U.S. Cl. ......................................... 359/48; 359/40; 359/71; 359/86; 359/87; 359/98; 359/68; 359/75; 359/83; 359/66; 116/63 R; 340/907; 340/815.67; 340/815.76
[58] Field of Search ............ 359/68, 71, 75, 98, 359/48, 49, 83, 86, 40, 66, 41; 345/88, 102; 116/63 R; 340/815.15, 815.16, 815.17, 815.32, 815.33, 907, 931

[56] References Cited

U.S. PATENT DOCUMENTS

| | | | |
|---|---|---|---|
| 3,618,005 | 11/1971 | Jensen | 340/930 |
| 4,040,727 | 8/1977 | Ketchpel | 359/70 |
| 4,043,639 | 8/1977 | Matsuyama et al. | 359/74 |
| 4,093,356 | 6/1978 | Bigelow | 359/71 |
| 4,196,973 | 4/1980 | Hochstrate | 359/69 |
| 4,315,258 | 2/1982 | McKnight et al. | 359/63 |
| 4,355,868 | 10/1982 | Perregaux et al. | 359/70 |
| 4,398,805 | 8/1983 | Cole | 359/65 |
| 4,436,337 | 3/1984 | Miller | 359/71 |
| 4,560,241 | 12/1985 | Stolov et al. | 359/68 |
| 4,616,903 | 10/1986 | Fergason | 359/52 |
| 4,630,894 | 12/1986 | Cremers | 359/63 |
| 4,643,525 | 2/1987 | Haim | 359/71 |
| 4,652,851 | 3/1987 | Lewin | 359/48 |
| 4,674,839 | 6/1987 | Tsuboyama et al. | 359/83 |
| 4,791,418 | 12/1988 | Kawahara | 359/48 |
| 4,793,691 | 1/1988 | Enomoto et al. | 359/50 |
| 4,799,050 | 1/1989 | Prince et al. | 359/49 |
| 4,802,742 | 2/1989 | Ichikawa et al. | 359/74 |
| 4,828,364 | 5/1989 | Saito et al. | 359/67 |
| 4,830,468 | 5/1989 | Stephany et al. | 359/50 |
| 5,172,256 | 12/1992 | Sethofer et al. | 359/98 |
| 5,179,460 | 1/1993 | Hinata et al. | 359/80 |

FOREIGN PATENT DOCUMENTS 7904883 12/1980 Netherlands ........................ 359/68

OTHER PUBLICATIONS

E. Kaneko "Liquid Crystal TV Displays: Principles and Applications of Liquid Crystal Displays".
KTK Scientific Publishers—1987—pp. 25–27 and 64–65.
Jones and Desa, "Recent advances in dichroic liquid crystal displays for automotive applications".
White and Taylor, "New absorptive mode reflective liquid-crystal display device." 9 Jan. 1974, pp. 4718–4723.

*Primary Examiner*—William L. Sikes
*Assistant Examiner*—Tai V. Duong
*Attorney, Agent, or Firm*—Davis Hoxie Faithfull & Hapgood

[57] ABSTRACT

A liquid crystal lens assembly that can be used to replace existing color lenses in traffic signals without the need for any special modifications to the traffic signal. The lens assembly utilizes a dichroic liquid crystal mixture that absorbs light when no electric field is applied to the mixture. When an electric field is applied across the liquid crystal mixture by two electrodes, the molecules change their orientation within the mixture and absorb less light, and the signal appears "on". The illumination of the bulb behind the lens assembly is visible to the user. The electric field is energized at the same time that the bulb for the traffic signal is illuminated. A colored transflector positioned in the rearward portion of the lens assembly provides the color for the signal and also acts to reflect light from the front of the lens assembly. Wires for applying the electric field to the electrodes connect directly to the terminal block for the traffic signal. A heater may be used to maintain the liquid crystal mixture at a minimum threshold temperature.

19 Claims, 8 Drawing Sheets

ELECTRO-OPTICAL LENS ASSEMBLY

FIELD OF THE INVENTION

This invention relates to an electro-optical traffic signal lens assembly designed to replace a conventional colored plastic lens in a traffic signal, and a method of converting a light source into a signal indicator utilizing an electro-optical lens assembly. A preferred embodiment of the lens assembly of the present invention utilizes a dichroic liquid crystal mixture as the electro-optical shutter element.

BACKGROUND OF THE INVENTION

Traffic signals in use today generally utilize an incandescent bulb positioned behind a green, yellow or red plastic lens. The bulb in each individual traffic signal assembly is illuminated at an appropriate time by an electronic controller, which often operates under the control of a timer. For example, the traffic signal that utilizes the green lens is illuminated for 45 seconds, the "yellow" signal is then illuminated for 5 seconds, and the "red" signal then is illuminated for 45 seconds. Alternatively, the "green" signal can be illuminated continuously until such time as a vehicle approaches the intersection from a cross-street, as sensed by a sensor element in the road, at which time the "green" light is turned off and the "yellow" light is illuminated, and then the "red". Other ways to control the illumination of particular signal lights are well known.

Present technology in use for traffic signals has five main areas where improvements are desirable, namely, (1) improved "readability" in sunlight, (2) lower power requirements, (3) reduction of glare at night, (4) improved redundancy, and (5) reduced weight and wind resistance.

The term "readability" refers in part to the situation where the sunlight is shining directly into the signal and the observer looks directly at the signal. In this situation, it is difficult for the observer to easily "read" or "distinguish" the signal information. In other words, the observer has a difficult time determining which of the signal lights is illuminated. The observer can see the signals but cannot easily differentiate between one that is "on" and ones that are "off".

When the sun is shining directly into the signal, the sunlight is reflected from the front surface of the signal (which is usually colored plastic), directly into the observer's eyes. Because the sunlight is much more intense than the light emitted from the "on" signal, all signal surfaces are reflecting the sunlight and may appear to be "on". The observer may be unable to differentiate between that signal which is actually "on" and those signals which are "off". Again, there are two ways to address this problem, namely either increasing the brightness of the "on" signal or somehow significantly reducing the reflected brightness of the "off" signals.

Observation of traffic signals at night presents a different problem, specifically the problem of glare. Glare consists of too much light or brightness emitted from the "on" signal. This produces excessive reflections from the road, especially when wet, and from the housing structure surrounding the signal. The result is that the observer has more difficulty in reading the signal because of the added distractions in his viewing area.

Obviously, increasing the brightness of the "on" signal, a possible solution to the problem of sunlight readability, is not a sufficient solution to the problem of night time glare. Further, increasing the brightness of the "on" signal may involve increasing the intensity of the incandescent lamp, requiring more electrical energy and reducing the lifetime of the lamp.

"Redundancy" relates to the ability of the traffic signal to remain readable when the incandescent lamp fails. In conventional traffic signals, if the lamp fails, the observer cannot determine which signal is "on", as none of the individual signals in the traffic light are illuminated.

The need for a traffic signal having reduced weight and wind resistance refers to the fact that a heavy, large surface area hood is secured to the front of most conventional traffic signals in order to cut down on glare and to help shade the lens from sunlight, thereby making the signal more readable.

In order to overcome these problems, a preferred embodiment of the lens assembly of the present invention uses dichroic liquid crystal technology to increase the perceived differences between the "on" and "off" signals by increasing the relative contrast between signal lights, rather than just increasing the brightness or intensity of the "on" signal.

Contrast concerns the condition of one signal relative to another and thus describes the performance of the signals. There are two types of contrast important in the context of traffic signals. One is brightness contrast and the other is color contrast. Brightness contrast is simply the ratio between the brightness emitted from one signal relative to another. If one signal emits three times as much light as the other, the contrast between the two signals is 3:1 or just 3.

Color contrast is primarily described by two parameters, brightness and color difference. Both of these parameters are measurable. Two signals of the same color and same measured brightness cannot be distinguished from one another by an observer. If the same signals are now different colors and still have equal brightness, an observer will distinguish a difference between the signals if the color difference is sufficient. The difficulty is that the resulting color contrast measurements do not always correctly describe whether or not the color contrast is good. In the specific application where only three distinct, well defined colors are being used, such as in a green, yellow and red traffic signal, a qualitative description of the color contrast will suffice.

The lens assembly of the present invention enhances both brightness and color contrast of traffic signals.

One attempt to improve the visibility of traffic lights is shown in U.S. Pat. No. 4,791,418 to Kawahara. In the '418 patent, a liquid crystal device is attached to a cylindrical hood on the front of the signal light, in front of a colored plate or cover that is attached to the casing of the signal. The colored plate or cover in turn is positioned in front of the lamp for the signal. The liquid crystal device has an encapsulated liquid crystal material with a dye, such that incident light is scattered when no electric field is applied to the liquid crystal, and transmits incident light when an electric field is applied. Transparent electrodes on either side of the liquid crystal material are used to apply the electric field. Power is supplied to the electrodes at the same time power is applied to the lamp for the signal. A battery is shown as the power source, although an alternating current source is also mentioned in the '418 patent specification.

In order to increase the visual distinguishability of the colored plate that is located in front of the bulb for the signal light, the '418 states that a surface of the colored plate can be coated with a transparent light-scattering paint. The '418 patent also states that a light transmitting body coated with a transparent light-reflecting film may be placed between the lamp and the transparent color plate. Alternatively, the transparent light-reflecting film can be applied to the interior surface of the transparent colored plate.

The '418 patent also mentions applying film on the outer surface of the liquid crystal device for absorbing ultraviolet light, and also applying a non-reflecting light film to the liquid crystal device. The '418 patent also states that the non-reflecting light film may be coated onto the transparent electrodes.

The '418 patent further states that, in place of an encapsulated liquid crystal, a polarizer, analyzer and a liquid crystal exhibiting twisted nematic effects may be used.

Another traffic signal that uses a liquid crystal shutter is shown in U.S. Pat. No. 4,652,851 to Lewin, which discloses a traffic signal that uses one, or a group of, continuously illuminated fluorescent or HID lamp(s) and attenuation devices on each signal. One form of attenuation device identified in the '851 patent is a liquid crystal panel, where the panel is either opaque or clear, depending on whether an electric field has been applied to the liquid crystal panel. Color for the signals is provided by a colored lens on the outside of the signal or by a combination of colored fluorescent lamps and color filters or lenses.

The apparatus of the present invention, which is a lens assembly that can be used to completely replace the colored lens of a conventional traffic signal, provides for enhanced visibility and improved redundancy of the signal, and also overcomes certain other failings in known prior art systems. The method of the present invention represents an improved way of converting a light source into a signal indicator using an electro-optical shutter, for example, a shutter that utilizes dichroic liquid crystal material.

SUMMARY OF THE INVENTION

The method of the present invention includes converting an electrically operated light source that has a power supply, such as a conventional traffic signal, into a signal indicator by applying to the front of the light source an electro-optical shutter lens assembly that transmits minimal light in a first state and transmits more light in a second state. The lens assembly is secured to the housing of the light source, and conductors from the lens assembly are connected to the power supply for the light source. When the power supply is energized the shutter of the lens assembly opens and transmits light.

The apparatus of the present invention includes a lens assembly for converting a light source into a signal indicator, particularly with reference to a traffic signal.

In a detailed embodiment of the present invention, the lens assembly has a rear transparent housing and a transflector positioned forward of the rear housing, where the transflector has transparent color means for transmitting through the transflector as colored light any light originating from behind the transflector, and reflection means for reflecting forward any light incident to the transflector from the front of the assembly. Positioned in front of the transflector is a first transparent glass substrate, which has deposited on its front surface a first transparent electrode made, for example, of indium tin oxide. A layer of liquid crystal material such as dichroic liquid crystal is positioned forward of the first electrode. The liquid crystal layer has two states—one where it absorbs a significant portion of the incident light and the other where it absorbs significantly less light and thus transmits much of the incident light. A second electrode is positioned forward of the liquid crystal layer, the second electrode being deposited on a rear surface of a second transparent glass substrate.

Means are provided for changing the liquid crystal layer from the first state to the second state by selectively applying power from the power source to the first electrode and the second electrode. Finally, there is a first transparent housing positioned forward of the second substrate, where the entire lens assembly from the rear housing to the front housing is approximately the same size as a colored lens in a conventional traffic signal, and the lens assembly can be used to replace the colored lens in a traffic signal.

A further feature of the lens assembly of the present invention is a heater for heating the liquid crystal layer to at least a threshold minimum temperature.

The manner for selectively providing power to the first electrode and the second electrode is by electrically connecting a first terminal connection on a terminal block for the power source to the first electrode and electrically connecting a second terminal connection on the terminal block for the power source to the second electrode. Similar connections are made to the terminal block for providing power to the heater.

The lens assembly may also have a transparent $SiO_2$ layer positioned on the front surface of the first electrode substrate and a second transparent $SiO_2$ layer positioned on the rear surface of the second electrode substrate. An alternate embodiment adds a third transparent $SiO_2$ layer positioned between the front surface of the first substrate electrode and the rear surface of the first electrode liquid crystal layer.

The lens assembly can also include a first transparent anti-reflective coating on the front surface of the second substrate, a second transparent anti-reflective coating on the rear surface of the front housing and a third anti-reflective coating on the front surface of the front housing.

An alternate embodiment has an optical cement between the front surface of the second substrate and the rear surface of the front housing. This material (for example, Summers laboratory, Type J-91) will fill the air gap between the respective surfaces thereby eliminating the need for the antireflective coating on the rear surface of the front housing and the front surface of the second substrate.

DETAILED DESCRIPTION

Figure 1:
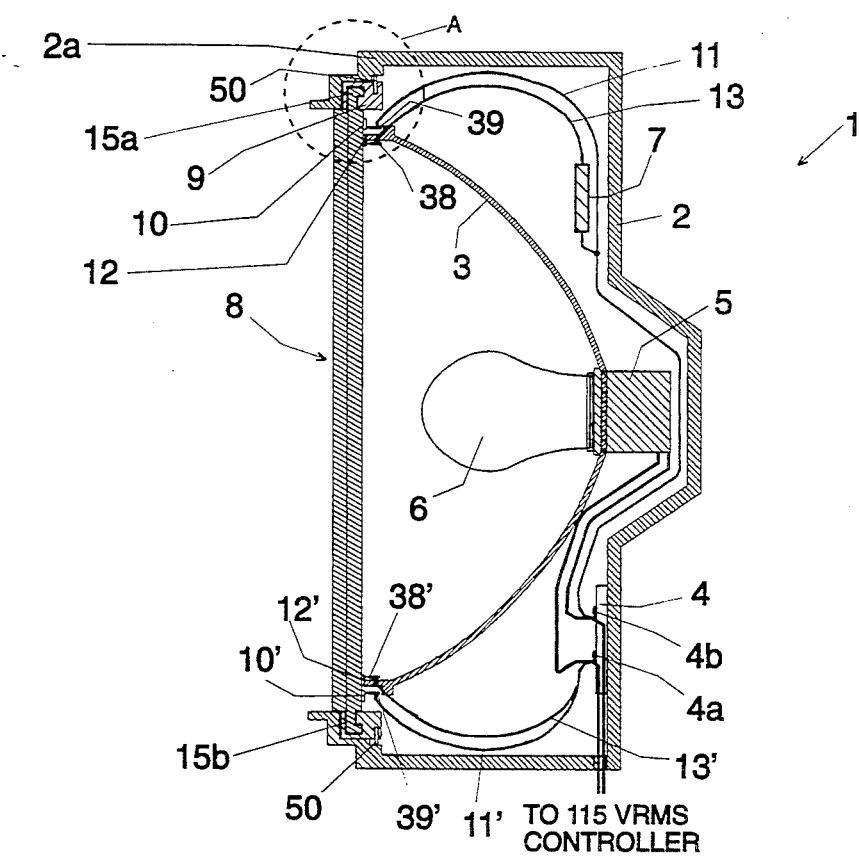
FIG. 1 is a cross-section view of a single-color traffic light assembly utilizing an LCD lens assembly of the present invention.

The traffic signal LCD lens assembly 8 of the present invention is designed to replace the plastic colored lens that is presently used in colored traffic signals. The basic elements of a traffic signal 1 that incorporates the LCD lens assembly 8 of the present invention are shown in FIG. 1.

The traffic signal 1 has a housing 2 generally made of cast aluminum or molded plastic. Within the housing 2 is a lamp socket 5, which is connected to a conventional 115 volt rms traffic signal controller through first and second terminal connections 4a and 4b on terminal block 4. Incandescent bulb 6 is screwed into socket 5 and provides the illumination for the traffic signal 1. The 115 volt rms controller acts in a conventional manner to selectively provide power to the bulb 6. For example, in a unit containing three traffic signals (green, yellow, red), the controller applies a voltage to the traffic signals in sequential order, where, for example, the "green" signal is illuminated for a set period of time, then the "yellow" signal, and then the "red" signal.

Reflector 3, mounted in an arc around the bulb 6, reflects light from the bulb 6 in order to enhance the brightness of the light at the front of the traffic signal 1.

Figure 2:
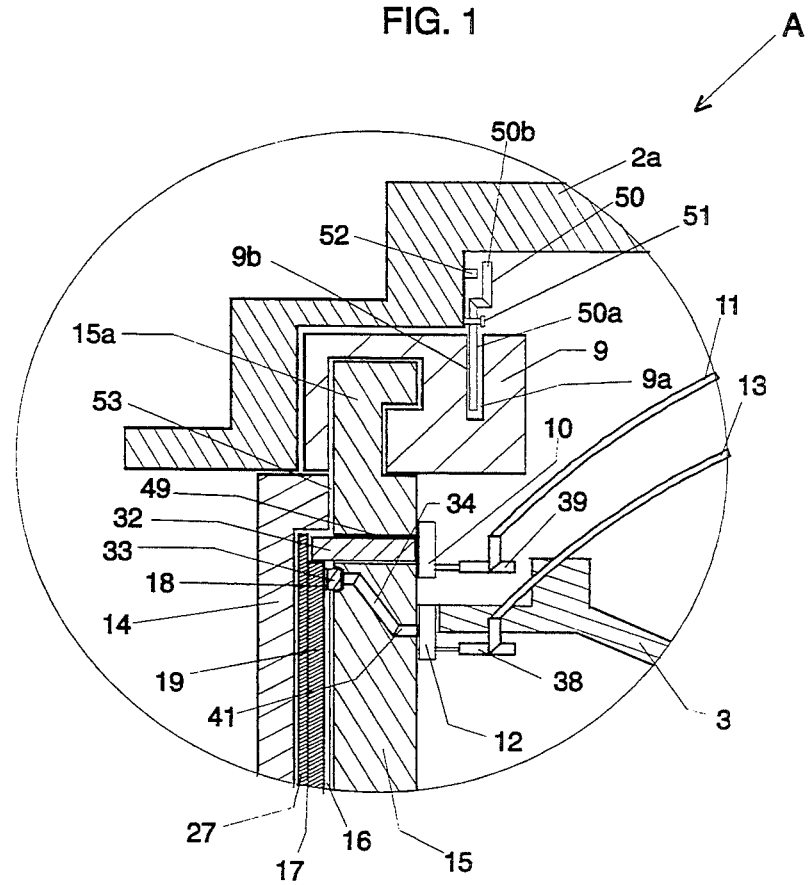
FIG. 2 is an enlarged detail view of the portion designated as "A" in FIG. 1.

The LCD lens assembly 8 of the present invention is seated, or otherwise form fits, into a gasket 9, which in turn is clamped to a front portion 2a of the housing 2 of the traffic signal 1. Top and bottom portions 15a and 15b of a rear housing 15 of the LCD lens assembly 8 are seated in the gasket 9, as shown in FIGS. 1 and 2.

In this way, the LCD lens assembly 8 can easily and quickly be substituted for the plastic colored lens used in conventional traffic signals. The resilient neoprene gasket 9 in the front portion 2a of the signal housing 2 receives the lens assembly. In many conventional traffic signals, a plastic colored lens is seated in the gasket 9, as is well known in the art. The top portion 15a and the bottom portion 15b of the rear housing 15 of the LCD lens assembly 8 fit into gasket 9 in exactly the same fashion as a conventional colored plastic lens.

Figure 14A:
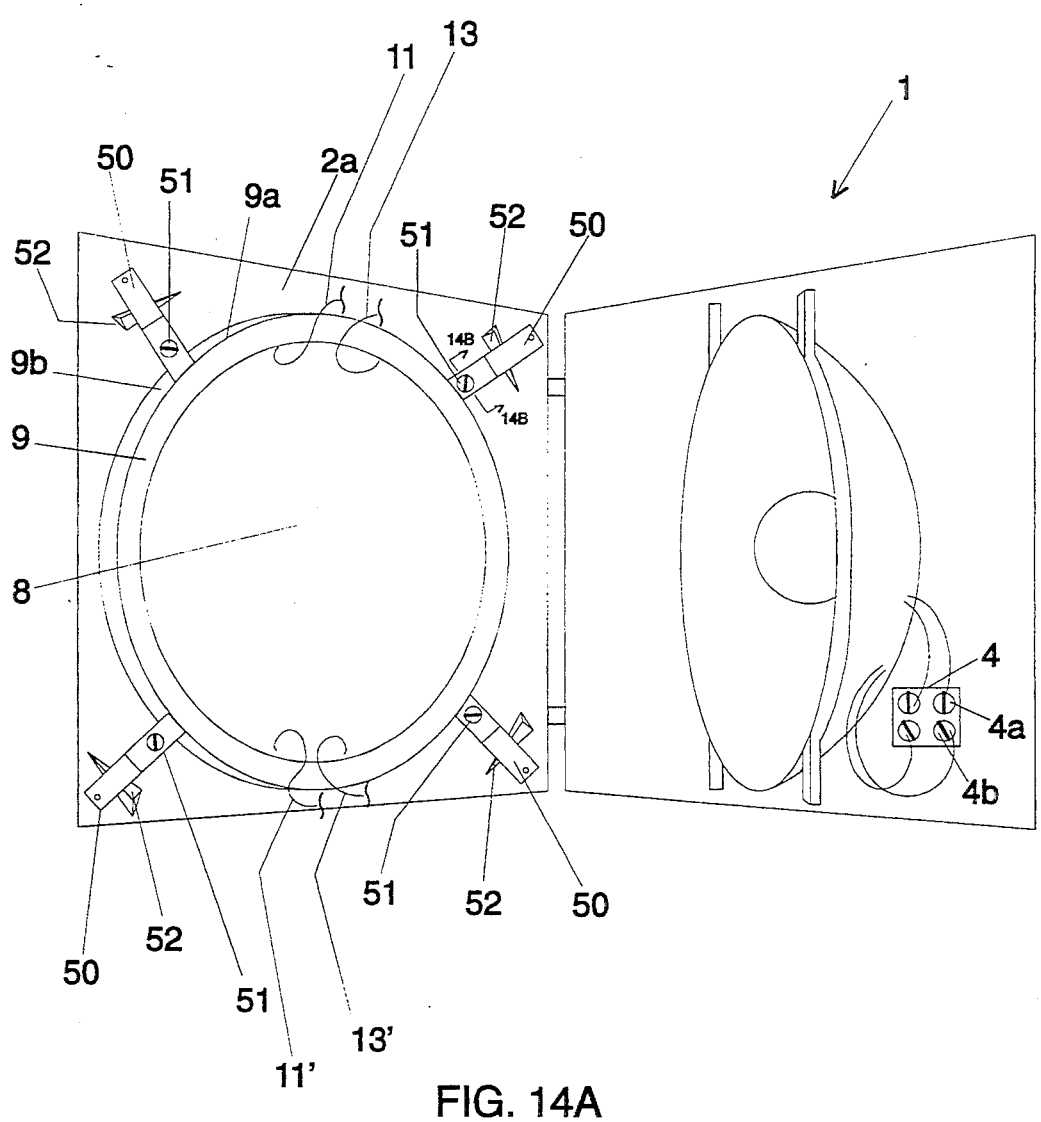
FIG. 14A is a perspective view of a traffic signal incorporating the LCD lens assembly of the present invention.
Figure 14B:
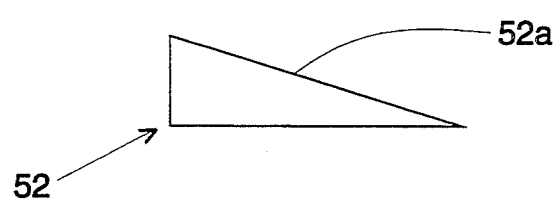
FIG. 14B is an elevational view in isolation of a ramp fitting of the housing of the traffic signal along lines 14B—14B of FIG. 14A.

A perspective view of the traffic assembly 1, including gasket 9, is shown in FIG. 14A. Referring to FIGS. 2, 14A and 14B, the front portion 2a of the housing 2 has four identical brackets 50 secured to the rear surface of front housing 2a, as seen in FIG. 14A. These brackets 50 are secured to the front housing 2a by means of screws 51. A first end 50a (FIG. 2) of each bracket 50 fits within a groove 9a (FIGS. 2, 14A) of the gasket 9.

A second end 50b (FIG. 2) of the bracket 50 rests against a ramp fitting 52 that is molded or welded or otherwise secured to the inside surface of the front housing 2a. As shown in FIG. 14B, the ramp fitting 52 is triangular in shape and has a sloped surface 52a. The gasket 9 and any lens seated in gasket 9, such as a conventional colored plastic lens, can be easily removed by loosening the screws 51 and rotating each bracket 50 out of groove 9a in gasket 9. The combination of the gasket 9 and any lens seated therein is then removed, the old lens taken out and the LCD lens assembly 8 inserted into gasket 9 in the same seating relation as the conventional plastic colored lens, with top and bottom portions 15a and 15b of the rear housing 15 seated in the gasket 9. This is accomplished by stretching the gasket 9, inserting the housing 15 into the gasket 9, then allowing the gasket 9 to conform to the shape of the housing 15. The LCD lens assembly 8 and gasket 9 are then applied to the front housing 2a. In order to secure the gasket 9 and LCD lens assembly 8 to the front housing 2a, the installer rotates the brackets 50 such that the bottom ends 50a of the brackets 50 are again within the groove 9a of the gasket. As the brackets 50 are rotated, the top ends 50b of the brackets 50 "climb up" the sloped surface 52a of each ramp fitting 50, resulting in a friction fit such that the brackets 50 cannot inadvertently rotate. When positioned in groove 9a, bottom end 50a of bracket 50 presses against surface 9b of gasket 9, thus holding the gasket 9 and the LCD lens assembly 8 in place in the front housing 2a of the signal 1. The screws 51 are then tightened down to insure that the gasket 9 and LCD lens assembly 8 remain securely attached to the front portion 2a of the housing 2.

In this fashion, the LCD lens assembly 8 of the present invention, which can be any kind of electro-optical shutter, can easily be substituted for a conventional colored plastic lens in the gasket 9.

Brackets 50, screws 51, ramp fittings 52 and gasket 9 are conventional elements all found in numerous existing traffic signal assemblies.

Any other suitable method of replacing the lens in a traffic signal with the LCD lens assembly 8 may be used in order to practice the method of the present invention, depending on the configuration of the housing 2, for example, adhesive, screws or other fasteners.

In the method of the present invention the lens assembly 8 is applied to the housing of a light source, such as housing 2 of traffic signal 1, and is then secured to that housing whereby conductors from the lens assembly are available to be connected to the power supply for the light source.

A preferred embodiment of the LCD lens assembly 8 is shown in detail in FIGS. 2, 3, 4, 6, 8, 9A, 10 and 12, with various alternate embodiments shown in FIGS. 7, 9B, 9C, 11 and 13. FIG. 5 schematically shows one manner of electrical connections to the 115 volt rms controller for all embodiments when used in a traffic signal, and FIGS. 14A and 14B together with FIG. 2 show one way to secure the lens assembly 8 to the housing 2 of the traffic signal 1. FIG. 1 shows generically the use of an LCD lens assembly or electro-optical shutter 8 in a traffic signal.

Figure 3:
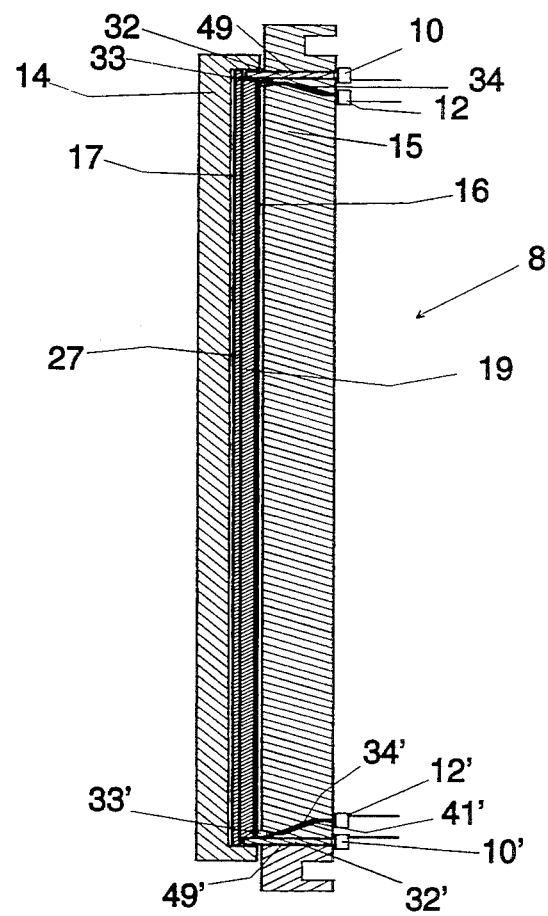
FIG. 3 is a cross-section view in isolation of the LCD lens assembly of FIG. 1 with certain electrical connection elements and where various elements are enlarged in both width and height in order to better illustrate various components.
Figure 4:
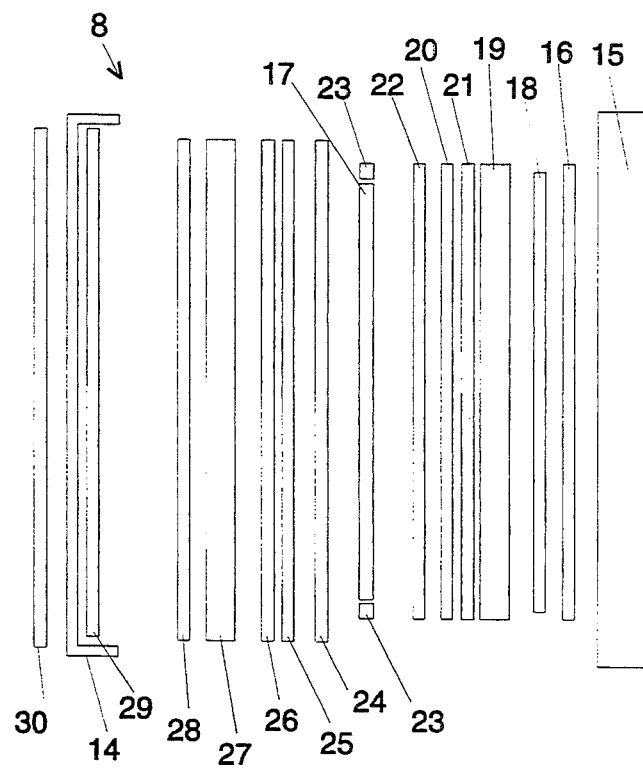
FIG. 4 is a schematic representation of the various parts of the LCD lens assembly of FIGS. 1-3.
Figure 5:
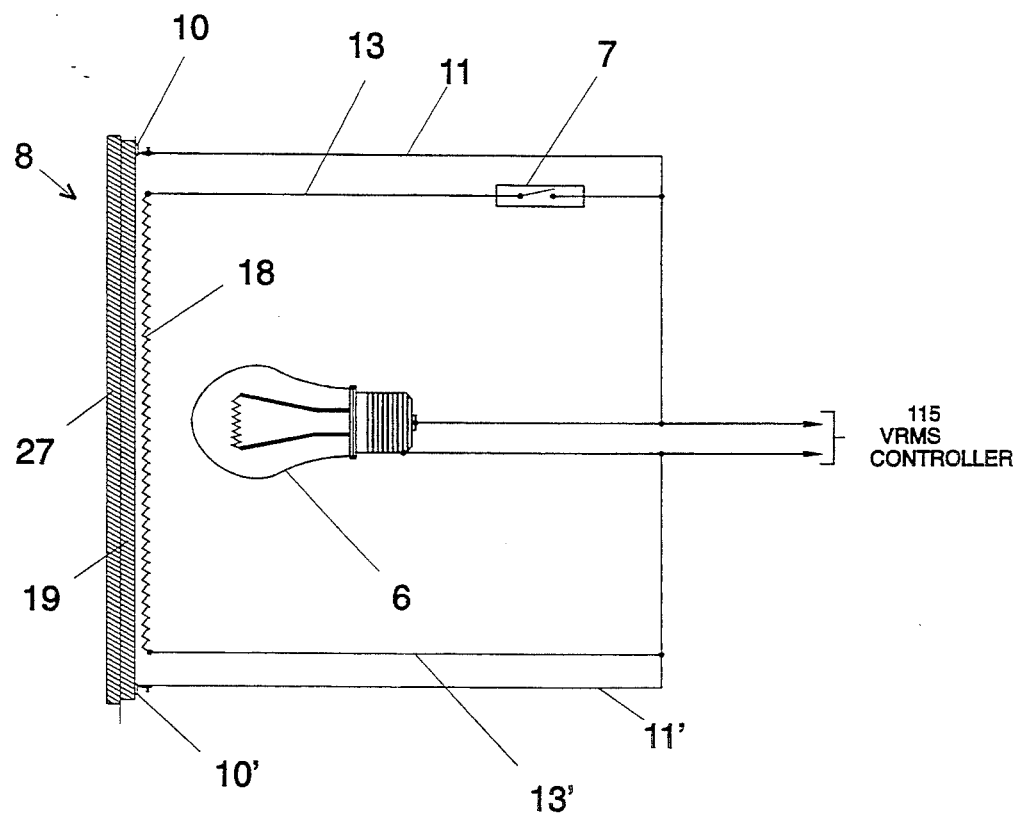
FIG. 5 is a schematic representation of an electrical connection system for the traffic light assembly shown in FIG. 1.

Referring to FIGS. 3 and 4, beginning at the rear of the LCD lens assembly 8, there is a rear transparent housing 15 made preferably of a plastic such as polycarbonate, having UV radiation absorption characteristics. The rear plastic housing 15, on its rear surface, may also have contours or prisms as in current lenses used in traffic signals. These contours are used to direct the light.

Positioned in front of the rear housing 15 is a transflector 16, which is translucent to light emanating from the bulb 6 (FIG. 1). The transflector 16 also, however, acts to reflect forward any light (for example, from the sun or a vehicle headlight) that is incident on the transflector 16 from the front of the LCD lens assembly 8.

The transflector 16 produces the desired color for the traffic signal 1. A preferred construction of the transflector 16 is described below with regard to FIG. 12.

In front of the transflector 16 is a heater 18 for, when necessary, maintaining the liquid crystal layer 17 in the LCD lens assembly 8 at a necessary minimum operating temperature. In the embodiment shown, the heater 18 is a transparent indium tin oxide (ITO) electrode that is patterned. Patterning (depositing ITO in specific areas) is used to control the heat uniformity and heating density of the liquid crystal mixture 17.

Figure 8:
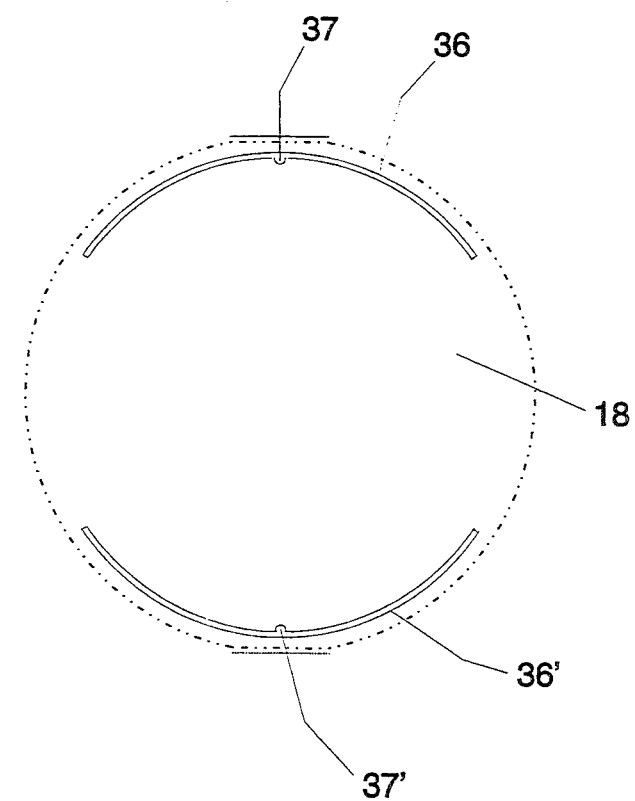
FIG. 8 is a rear elevational view of a portion of the LCD lens assembly showing heater bus bars on a heater used for maintaining a minimum temperature in a liquid crystal mixture within the LCD lens assembly.
Figure 10:
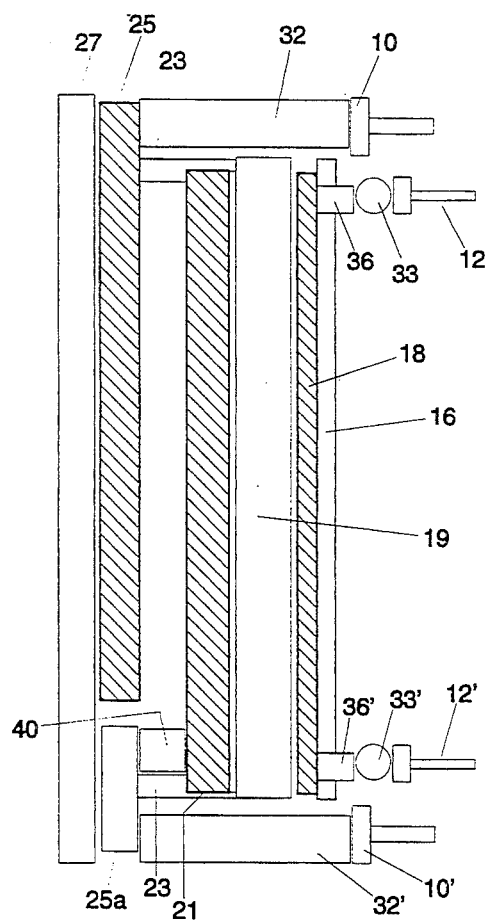
FIG. 10 is a schematic representation of a preferred manner of electrical interconnection to a front electrode and a rear electrode and to the heater of the LCD lens assembly.

Referring to FIGS. 2, 5, 8 and 10, the electrical connection of power from the 115 volt rms controller to the heater 18 is accomplished in the following manner. First, mounted on a rear surface of the heater 18 are two arcuate metallic bus bars 36 and 36' (FIGS. 8 and 10). The bus bars 36 and 36' are applied to the rear surface of the heater 18 by means of thin film metal deposition, thick film screening or an equivalent process. Referring to top bus bar 36, centered within that arcuate bus bar is a tab 37 designed to contact an elastomeric conductive sphere 33 (FIGS. 2, 3 and 10) that is compressible (as shown in FIG. 2) and makes electrical contact between the bus bar 36 and a wire conductor 34. The wire conductor 34 passes through an opening 41 in the rear housing 15 of the LCD lens assembly 8 and is electrically connected to an LCD heater interconnection 12. A plug connector 38 in turn electrically connects the LCD heater interconnection 12 to a heater control 7 through wire conductor 13. As shown in FIG. 1, the control 7 (represented schematically as a thermal switch in FIG. 5), is electrically connected to the second terminal connection 4b of terminal block 4.

As shown in FIGS. 1, 3, 8 and 10, a second set of elements 36', 37', 33', 12', 38' and 13' connect the heater 18 to the first terminal connection 4a of terminal block 4. Thus, as shown in FIG. 5, the heater 18 is electrically connected across the 115 volt rms source, provided the switch in heater control 7 is closed. The thermal switch 7, which may be a bi-metal or thermal reed, closes when the temperature in housing 2 of the traffic signal 1 is below some predetermined threshold value. For an LCD mixture 17 comprising dichroic liquid crystal material, as described below, a temperature threshold of 0° C. for the heater control 7 may be appropriate.

Referring to FIG. 5, when the ambient temperature indicated by the thermal switch 7 is below the predetermined threshold, the thermal switch 7 is closed. If the 115 volt rms controller is applying power to terminals 4a and 4b at the time switch 7 closes, then power is also applied to the heater 18.

The heater 18 can be positioned wherever it best performs the function of keeping the liquid crystal mixture 17 at and above the predetermined threshold temperature. Applicants believe that the heat from the illuminated incandescent bulb 6 will generally maintain the LCD mixture 17 at or above the predetermined threshold temperature level, and thus the heater 18 will not often be needed. In fact, there will be some instances where the temperature within signal housing 2 reaches unacceptably high value due to the heat generated by bulb 6. This problem can be alleviated by heat sinking the LCD lens assembly 8 to the traffic signal housing 2, or by use of reflective mirrors in the housing 2 to reflect infrared energy (heat) away from the LCD mixture 17 in the LCD lens assembly 8.

The next element forward of the heater 18 is a rear glass substrate 19, which can be made of soda lime glass or borosilicate glass, or any other suitable transparent glass, plastic or other material. The heater 18, when used, is deposited on the rear surface of the rear glass 19 by means of thin film deposition.

An alternate embodiment of a heater is to use a separate heater element, such as a plastic or glass substrate with a deposited ITO heater, and then adhere that heater element to the rear surface of the rear substrate 19. Another embodiment of the heater 18 involves use of a patterned fine wire mesh or foil adhered to the rear surface of the rear substrate 19.

Figure 12:
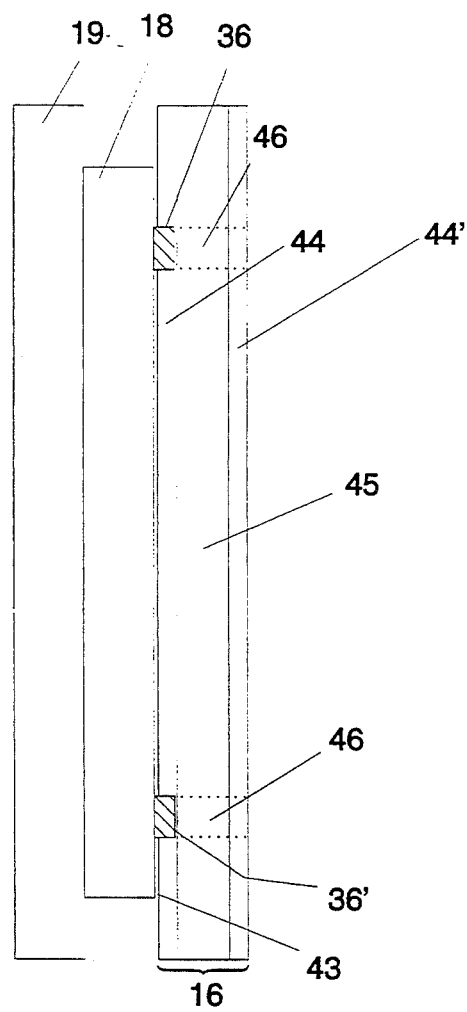
FIG. 12 shows details schematically of the construction of a preferred embodiment for a transflector of the LCD lens assembly.

A preferred manner of construction of the transflector 16 is shown in FIG. 12. The transflector 16 in FIG. 12 is approximately the same area as the rear glass substrate 19.

First, a clear adhesive 43 is applied to the rear surface of the heater 18. The transflector 16 is then secured to the adhesive 43. Alternatively, the clear adhesive can be applied to the front surface of the transflector 16.

In the FIG. 12 embodiment, the transflector 16 is constructed of a translucent thin colored paint or ink coating 44 applied to a translucent white polyester material 45. The polyester material 45 may be the product distributed under the trade name MELENIX or an equivalent. The MELENIX material is available from ICI Films, Inc. of Wilmington, Del. Annular openings 46 through the coating 44 and the polyester material 45 allow for the electrical connection of the power source to the heater bus bars 36 and 36'.

The coating 44 provides the necessary color for the traffic signal 1 (for example, green, yellow or red).

Thus, light from bulb 6 is appropriately colored after it passes through the thin coating 44. The polyester material 45 also allows light from the bulb 6 to pass through it. However, any light incident on the transflector 16 from the front of the lens assembly 8 is reflected back toward the front of the signal by the polyester material 45. Coating 44 also reflects toward the front of the signal any light incident on the transflector 16 from the front of the lens assembly 8.

A translucent painted coating 44' may also be applied to the rear surface of the polyester film material 45, as shown in FIG. 12. This color layer 44' will affect the transmissive color (in conjunction with the first color layer 44) of the signal. Color layer 44' has the primary effect on the transmissive color of the signal.

Thus, the transflector element 16 acts to transmit forward the light from bulb 6, and also reflects any incident light from the front of the traffic signal 1. In other words, the transflector 16 is translucent, allowing light from behind (from bulb 6) to pass through, and reflecting light incident from the front of the traffic signal 1.

Figure 13:
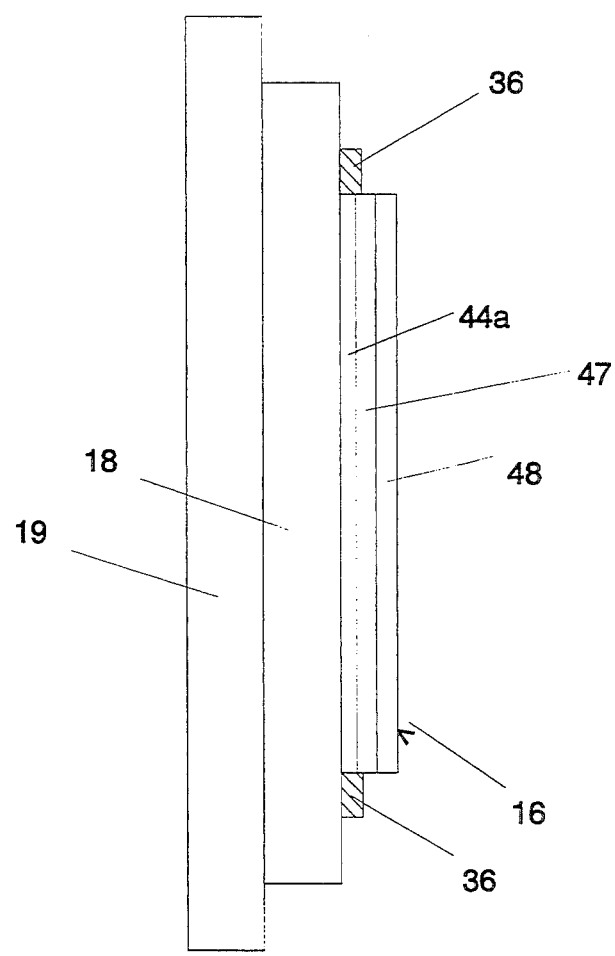
FIG. 13 shows details schematically of the construction of an alternative embodiment for the transflector of the LCD lens assembly.

An alternate manner of construction of the transflector 16 is shown in FIG. 13, where a thin translucent coating 44a of colored paint or ink is applied directly to the heater 18. A thin coating of white paint 47 is then applied over the thin coat 44a. The white paint may contain barium sulfate or the like. If needed, a coat of a protective material 48, such as a clear acrylic paint, may then be applied over the white paint 47 to protect the transflector 16 from damage such as scratches. The transflector 16 in FIG. 13, which consists of colored coating 44a, white paint 47 and protective coating 48, extends at least the area between the two bus bars 36 and 36' on the rear surface of the heater 18.

Alternatively, to enhance the color of the traffic signal, the transflector 16 may consist of a colored transparent plastic piece and a layer of thin translucent white ink or paint. Any suitable construction of the transflector 16 may be used, provided the transflector allows transmission of light from the bulb 6 to the forward face of the lens assembly 8 and also reflects toward the front of the lens assembly 8 any light incident on the transflector 16 from the front of the lens assembly 8.

Figure 6:
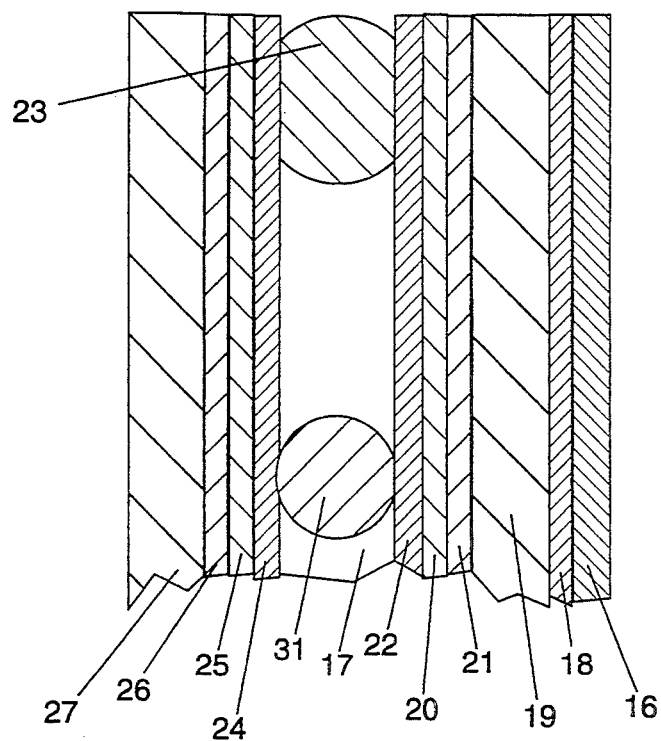
FIG. 6 is a cross-section in detail of a portion of the LCD lens assembly shown in FIG. 4.

Referring to FIGS. 4 and 6, a rear transparent electrode 21, which is an indium tin oxide electrode in a preferred embodiment, is deposited on a front surface of the rear glass substrate 19. The manner of the electrical connection of the 115 volt rms controller to the rear electrode 21 is explained in detail below with reference to FIG. 10.

Figure 7:
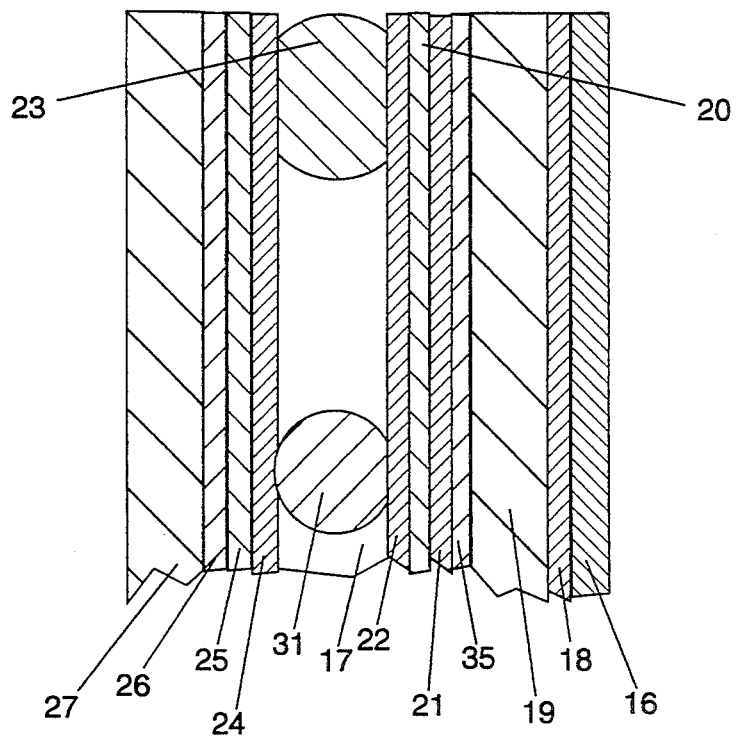
FIG. 7 is a cross-section in detail of a portion of another embodiment of the LCD lens assembly.

In the FIG. 7 embodiment, a passivation layer 35 is interposed between the rear glass substrate 19 and the rear electrode 21. This passivation layer 35, typically constructed of $SiO_2$, acts to prevent migration of sodium ions from the glass substrate 19 to the ITO electrode 21. The presence of sodium ions could cause changes at a rear alignment layer 22 due to electrochemical interactions, resulting in an ineffective lens assembly 8.

Forward of the rear electrode 21 is a protection layer 20 of $SiO_2$ material that acts to protect against possible shorts between the rear electrode 21 and a front electrode 25, thus improving LCD reliability. Forward of the protection layer 20 is a rear alignment layer 22 for the liquid crystal mixture 17. The rear alignment layer 22 is made of methyl cellulose or equivalent and serves to determine the orientation of the liquid crystal molecules in the liquid crystal layer 17 at this boundary layer 22.

Forward of the rear alignment layer 22 is the liquid crystal mixture 17. In a preferred embodiment, the mixture 17 is a dichroic liquid crystal material, composed of a combination of a nematic liquid crystal, an organic dye, and a cholesteric dopant. The dopant gives the liquid crystal molecules a twist, and thus increases the contrast ratio between the "off" and "on" states of the lens assembly 8. The precise formulation of a preferred embodiment of the liquid crystal mixture 17 is as follows:

| Material | EM Industries Designation |
|---|---|
| 1) Guest/Host Mixture: | ZLI-4714 |
| 2) Host Material: | ZLI-3950 |
| 3) Cholesteric: | S811 |

Materials 1-3 above are commercially available from EM Industries, Inc., Hawthorne, N.Y. 10532.

A preferred embodiment of the mixture 17 is obtained by diluting mixture 1) with host material 2), to achieve 2% dye (guest) by weight. The cholesteric material 3) is then added, to achieve 4% cholesteric by weight.

The mixture 17 can operate at temperatures as high as approximately 100° C., and thus is suitable for use in a traffic signal 1 that is located in a hot ambient environment or where the heat generated by the incandescent bulb 6 raises the temperature within the confined space of the traffic signal 1.

The liquid crystal mixture 17 acts to absorb much of the transmitted light from bulb 6 when no electric field is applied across the mixture 17. By choice of suitable dyes, as is known in the art, the mixture 17 will appear dark when no electric field is applied.

Specifically, when no electric field is applied to the liquid crystal mixture 17, the liquid crystal molecules are in a parallel (flat) orientation with respect to the rear glass substrate 19 and a front glass substrate 27, and the dye molecules orient themselves with their molecular axis parallel to the axis of the nematic liquid crystal molecules in the mixture 17. The dye molecules are referred to as "the guest" in this arrangement, where the nematic liquid crystal is the "host". As is known in the art, the dye "piggybacks" onto the host liquid crystal, and the combination is often referred to as a dichroic liquid crystal. The dye molecules, which are asymmetrical in shape and have a long axis and a short axis, thus absorb the maximum amount of the incident unpolarized light from the bulb 6 which is parallel to the dye molecules' long molecular axes, and the LCD lens assembly 8 appears dark. The dopant is added to the guest-host ("dichroic") material to give a twist to the molecules.

When an electric field is applied, the liquid crystal mixture 17 orients its molecules such that considerably less light is absorbed. The molecules in the liquid crystal mixture and the dye align with their long axes parallel to the electric field and allow transmission of approximately 50% to 70% of the light from the incandescent bulb 6. Specifically, when an electric field is applied perpendicular to the glass substrates 19, 27, the liquid crystal molecules in the mixture 17, because of their dielectric anistropy, will twist to align themselves perpendicular to the glass substrates 19, 27. The dye molecules "follow" the orientation of the liquid crystal molecules and align their molecular axis perpendicular to the glass substrates 19, 27. In this state there is only about 30% to 50% of the absorption of the incident light, and the traffic signal 1 will appear to be "on". The transmitted light will be of a color determined by the color of the ink or paint 44 and 44' in the transflector 16 (FIG. 12). The cholesteric dopant in the mixture 17 adds a twist to the liquid crystal molecules and enhances the contrast between the "off" condition (no electric field applied) and the "on" condition (electric field applied).

Thus, the liquid crystal mixture 17, under the control of the electric field generated across the rear electrode 21 and a front electrode 25, acts as an electro-optical shutter for the traffic signal 1. The state of the liquid crystal mixture 17 can be controlled using the conventional 115 volt rms source available at first and second terminal connections 4a and 4b on terminal block 4. The resulting LCD lens assembly 8 has a wide viewing angle due to the fact that this type of dichroic liquid crystal material has a lambertian distribution, unlike twisted nematic liquid crystal arrangements that use polarizers that limit the viewing angle.

Any material that can be electrically controlled to produce a first light absorption and/or scattering state and a second light transmissive state may be used as layer 17. Examples of such material include twisted nematic liquid crystal, PDLC encapsulated liquid crystal, NCAP encapsulated liquid crystal material, or materials utilizing electrochromic technology.

Forward of the liquid crystal mixture 17 is the front alignment layer 24, which is also made of methyl cellulose or equivalent. The layer 24 orients the liquid crystal molecules at the boundary layer 24. The parallel grooves in the layer 24 are at right angles to the parallel grooves in layer 22.

Forward of the front alignment layer 24 is the front transparent electrode 25, which, like the rear electrode 21, is preferably an indium tin oxide electrode. Electrodes 21 and 25 may be constructed of any suitable transparent conductive material.

Forward of the front electrode 25 is a front passivation layer 26 of $SiO_2$, which serves an identical function to the passivation layer 35 previously mentioned with regard to FIG. 7. The passivation layers 35 (FIG. 7) and 26 (FIGS. 6 and 7) are particularly useful when the glass substrates 19 and 27 are soda lime glass rather than borosilicate glass as sodium ions are quite prevalent in soda lime glass.

Forward of the front passivation layer 26 is the front glass substrate 27 made of soda lime or borosilicate glass. It is understood that the transparent substrate 27, as well as the rear transparent substrate 19, may also be made of a suitable transparent plastic or some other transparent material.

In order to maintain appropriate spacing between the rear electrode 21 and the front electrode 25 (for example, in the range of 8 microns or greater), glass fibers 31 (FIGS. 6 and 7) are used. These fibers are applied to one or the other of the substrates 19 and 27, where the substrates already have deposited on them the electrode and alignment layers.

In order to manufacture the LCD lens assembly 8, the two glass substrates 19 and 27, with appropriate layers deposited or otherwise applied to the substrates, and separated by glass fibers 31, are adhered to one another at the edges with an epoxy seal 23 (FIGS. 6, 7 and 10), leaving only a small fill hole. The liquid crystal mixture 17 is then inserted through the fill hole into the space between the electrodes 21 and 25, to a thickness of about 8 microns or greater. An epoxy plug is then used to close the fill hole. This results in a complete epoxy seal 23 around the entire perimeter of the glass substrates 19 and 27.

A preferred manner of electrically connecting the rear electrode 21 and the front electrode 25 to the 115 volt rms controller is shown in FIGS. 1, 2, 3 and 10.

Referring to the top portion of FIGS. 1, 2 and 10, the front electrode 25 is in electrical contact with an elastomeric conductive connector 32. The connector 32 passes through an opening 49 (FIG. 2) in the rear housing 15 of the LCD lens assembly 8, and is electrically connected to an LCD interconnect 10, which in turn receives a plug connector 39 (FIG. 2). Wire conductor 11 from plug connector 39 is secured to the second terminal connection 4b on terminal block 4 (FIG. 1).

Referring to the bottom portion of FIGS. 1, 3 and 10, a wire conductor 11' extends from the first terminal connection 4a on terminal block 4 to plug connector 39' which in turn is inserted into LCD interconnection 10'. An elastomeric conductive connector 32' passes through an opening 49' (FIG. 3) in the rear housing 15 and is in electrical contact with a bottom portion 25a of the front electrode 25 (FIG. 10). As shown schematically in FIG. 10, the bottom or subsidiary portion 25a of the front electrode 25 is electrically isolated from the remaining main portion of front electrode 25. Thus, the electrical connection between the first terminal connection 4a on the terminal block 4 to the subsidiary portion 25a of the front electrode 25 is electrically isolated from the connection of the second terminal connection 4b of the terminal block 4 to the first electrode 25.

The subsidiary portion 25a of electrode 25, which is a very small fraction of the entire area of electrode 25, is electrically connected to the rear electrode 21 through a conductive cross-over dot 40, shown in FIG. 10, which is made of a conductive material such as silver epoxy. Thus, the first terminal connection 4a on terminal block 4 is electrically connected to the rear electrode 21. The subsidiary portion 25a is actually only a fraction of the area of the main portion of the front electrode 25. Subsidiary portion 25a is shown oversized in FIG. 10 for illustrative purposes only.

Figure 11:
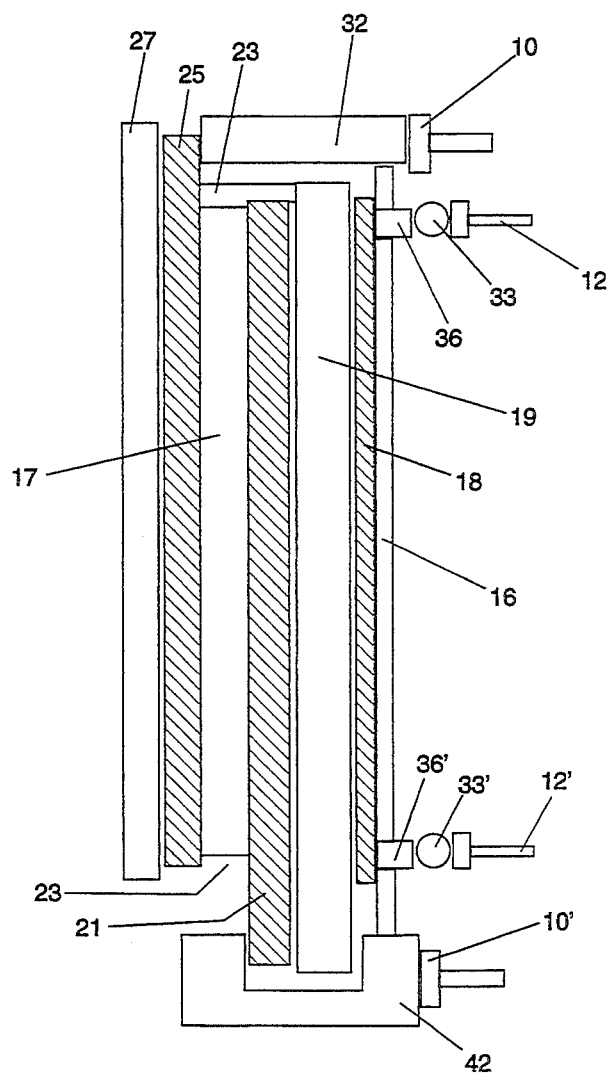
FIG. 11 is a schematic representation of an alternate manner of electrical connection to the electrodes and to the heater of the LCD lens assembly.

Alternatively, the first terminal connection 4a on terminal block 4 could be directly connected to the rear electrode 21, for instance, in the manner shown in FIG. 11. In FIG. 11, the electrical connection at the top of the Figure of the LCD interconnection 10 is identical to that described above with respect to FIG. 10. The manner of connection of the bottom LCD interconnection 10' to the rear electrode 21 in the FIG. 11 embodiment differs from that shown in the FIG. 10 embodiment. There is no subsidiary portion 25a of the front electrode 25 in the FIG. 11 embodiment.

In FIG. 11, the LCD interconnection 10' is in electrical contact with a U-shaped elastomeric conductive connector 42. That connector 42 is also in electrical contact with the rear electrode 21. Thus, the first terminal connection 4a on terminal block 4 is electrically connected to the rear electrode 21.

Alternative ways of electrically connecting the terminal connections 4a and 4b to the electrodes 21 and 25 and the heater 18 include soldering, clipping or epoxying wires directly to the electrode and heater connection areas.

Referring again to FIG. 4, applied to a front surface of the front glass substrate 27 by a deposit technique is an anti-reflective coating 28 made of multiple thin films.

The coating 28 serves to reduce glare and improve optical transmission from the incandescent bulb 6. Forward of glass 27 and coating 28 is front plastic housing 14 of the LCD lens assembly 8. Front housing 14 is made of the same material as rear housing 15. The rear facing surface of the housing 14 also has an anti-reflective coating 29.

Additionally, the front housing 14 may have a UV absorbing filter positioned on its rear surface. This would be included if UV filtering is required to allow the LCD assembly 8 to meet operational conditions in certain ambient environments.

Finally, applied to the front facing surface of the housing 14 is another anti-reflective coating 30. Alternatively, the front surface of the front housing 14 may be mechanically altered to reduce glare.

The rear housing 15 is secured to the front housing 14 by means of a snap fit, an adhesive or the like. FIG. 2 shows use of an adhesive 53 to secure the front housing 14 to the rear housing 15. The shape and configuration of the housing elements 14 and 15 are such that the entire lens assembly 8 can be easily and quickly substituted for the conventional colored lens in a traffic signal The user need only attach wires 11, 13, 11', 13' from the back of the LCD lens assembly 8 (FIG. 1) to the terminal connections 4a and 4b on the terminal block 4 in the traffic signal 1.

Alternatively, additional spade lugs or other connector types may be substituted on some terminal blocks.

Figure 9A:
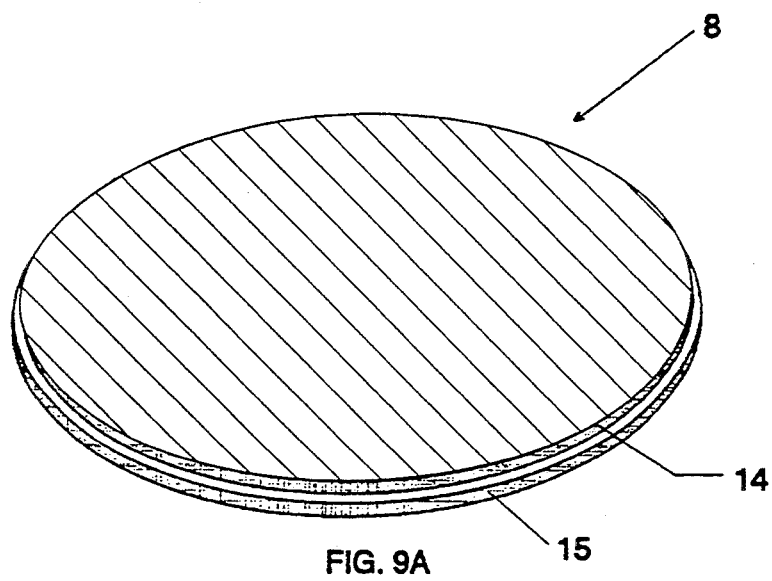
FIG. 9A is a perspective view of an embodiment of the LCD lens assembly.

As shown in FIG. 9A, which is a perspective view of a preferred embodiment of the LCD lens assembly 8, the front housing 14 is a disk which is concentric with, and has a slightly smaller diameter than, the rear housing 15.

Figure 9C:
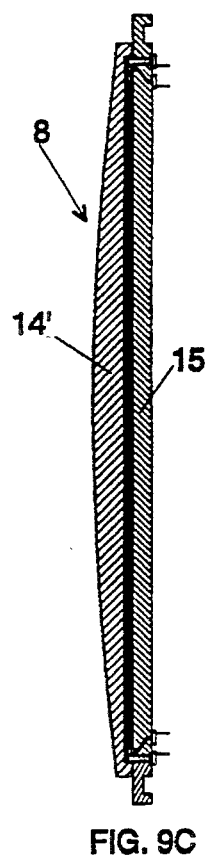
FIG. 9C is an elevated section view of yet another embodiment of the LCD lens assembly where the front plastic housing of the LCD lens assembly is shaped to redirect the incident light and transmitted light to improve performance of the LCD lens assembly for certain applications.
Figure 9B:
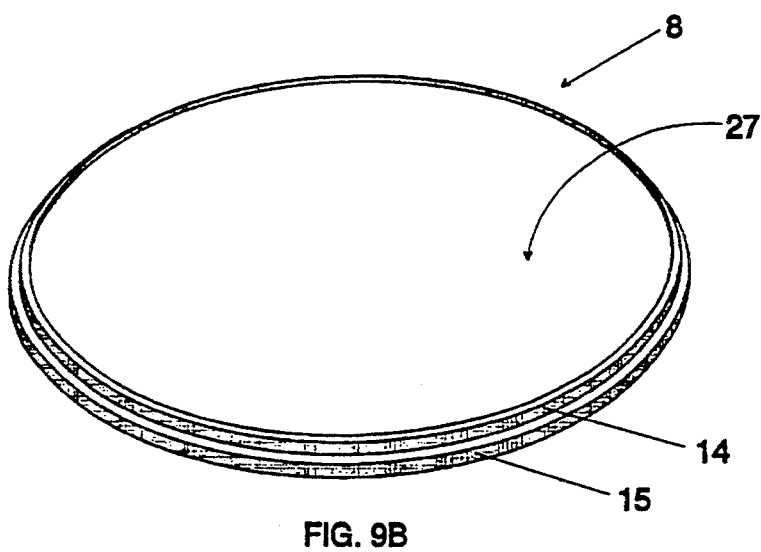
FIG. 9B is a perspective view of an alternate embodiment of the LCD lens assembly where a central section of a front plastic housing of the LCD lens assembly is open.

An alternate embodiment of the LCD lens assembly 8 is shown in FIG. 9B, where a central section of the front surface of the front housing 14 is cut away, leaving the front surface of the front glass substrate 27 exposed to the viewer. The FIG. 9B embodiment requires fewer anti-reflective coatings than the FIG. 9A embodiment, and results in a brighter appearance of the lens assembly 8 because the viewer sees the front glass substrate 27 directly. However, one possible disadvantage of the FIG. 9B embodiment compared to the 9A embodiment is that the front glass substrate 27 is exposed in the FIG. 9B embodiment, and is thus subject to damage, wear or abrasion. In the FIG. 9B embodiment a UV absorbing coating may be necessary on the front surface of the front glass substrate 27. Also, it is necessary in the FIG. 9B embodiment to insure that all elements and layers between substrates 19 and 27 are protected against any exposure to the ambient environment.

An additional embodiment is shown in FIG. 9C, where the front housing 14' is curved so as to redirect light to improve performance for certain applications where specular reflection needs to be directed away from the user or where it is important to direct the light from the lens assembly 8 in a particular direction.

The LCD lens assembly 8, when installed into a traffic signal 1, such as in FIG. 1, operates as follows.

When the 115 volt traffic signal rms controller is not applying power to terminal connections 4a and 4b on terminal block 4, bulb 6 is not illuminated and no electric field is applied across the liquid crystal mixture 17 through electrodes 21 and 25. Thus, the LCD lens assembly 8 will appear dark. The degree of darkness depends on the particular LCD mixture 17 chosen, including the choice of dyes. Antireflective coatings 28, 29 and 30 act to minimize any reflection from surfaces due to sunlight or headlights incident on the LCD lens assembly 8, thus maintaining a dark appearance to the LCD lens assembly 8 when the lens assembly 8 is "off".

When the 115 volt rms controller provides electrical signals to terminal connections 4a and 4b, a voltage is generated across those terminal connections, the bulb 6 is illuminated and power is applied to the front electrode 25 and the rear electrode 21. The resulting electric field across the liquid crystal mixture 17 results in transmission of approximately 30–50% of the light from the bulb 6 as previously described. The color of the light is determined by the color of the ink or paint 44 and 44' utilized in transflector 16 (FIG. 12).

When a voltage is applied across terminal connections 4a and 4b by the 115 volt rms controller, power is also applied to heater 18, provided the sensor in heater control 7 senses that the ambient temperature in the traffic signal 1 is less than the pre-set threshold temperature.

It is seen that the LCD lens assembly 8 is a direct replacement for the colored plastic lens presently used in conventional traffic signals. The discrete lens assembly 8 can, when necessary, also be easily replaced by another assembly 8 when needed. The electrical connections for the electric field across the electrodes 21, 25 are taken directly off of the readily available first and second terminal connections 4a and 4b on terminal block 4 of the traffic signal, which is in direct electrical connection with the 115 volt rms controller. Alternatively, there may be certain LCD lens assemblies that operate better optically at a lower voltage level (for example, 30 rms). In such instances, some sort of voltage divider will be necessary to step down the voltage supplied to the LCD lens assembly from the terminal connections 4a and 4b. The particular shape and configuration of the front housing 14 and the rear housing 15 of the LCD lens assembly 8 may be changed to allow for form fit or other integral fit relation with the housing 2 of various traffic signals 1.

Further, the LCD lens assembly 8 may be used in any situation where a light source needs to be converted into a signal indicator of some kind, so long as control signals are provided to the lens assembly 8 so that the liquid crystal mixture 17 is switched from its "off" (light absorbing or scattering) state to its "on" (light transmissive) state, and visa versa.

The LCD lens assembly 8 of the present invention enhances both the brightness contrast and the color contrast of the traffic signals that utilize the assembly 8. The use of the transflective LCD allows the "on" signal to be brighter because it reflects forward any ambient light that is incident on the transflector 16 from the front of the assembly 8, as well as reflecting the color of the transflector 16. The signals that are turned "off", because of the dark appearance of the LCD shutter, cannot reflect back any significant ambient light or the color of the transflector 16.

The assembly 8 also results in lower power requirements for the signal 1, as a lower wattage incandescent bulb 6 may be used because in the daytime the lamp is not needed to make the signal brighter than the sunlight that is illuminating the "on" signal. When the signal is "on", the electro-optic shutter is open, and the colored transflector 16 will reflect back sunlight. As the brightness striking the signal increases, the transflector 16 reflects more light back. Since the lamp 6 does not need to outpower the incident sunlight, it can now be a lower wattage lamp than that presently used in conventional traffic signals. This should be acceptable in most applications.

Further, night glare is reduced because the lamp 6 of lower wattage means reduced brightness. Since this lamp output is less than the lamp presently used in conventional traffic signals, there will be less excessive illumination from the signal at night. This also reduces the effect of light reflected from nearby objects and wet surfaces which can cause distractions to drivers at night.

Further, because of the reflective characteristics of the transflector 16, the lens assembly 8 will appear "on" if ambient light is available, even if the bulb 6 has burned out.

Our invention is defined by the following claims.

We claim:

1. A lens assembly for use in a traffic signal, the lens assembly comprising:
   a rear transparent housing;
   a transflector positioned forward of the rear housing, the transflector further comprising transparent color means for transmitting through the transflector as colored light any light originating from behind the transflector, and reflection means for reflecting forward any light incident to the transflector from the front of the assembly;
   a first transparent substrate positioned forward of the transflector;
   a first transparent electrode positioned on the front surface of the first substrate;
   a layer of liquid crystal material positioned forward of the first electrode, the liquid crystal layer not transmitting incident light when in a first state and transmitting incident light in a second state;
   a second electrode positioned forward of the liquid crystal layer;
   a second transparent substrate, wherein the second electrode is positioned on a rear surface of the second substrate;
   means for changing the liquid crystal layer from the first state to the second state by selectively applying power from a power source to the first electrode and the second electrode;
   a front transparent housing positioned forward of the second substrate, wherein the entire lens assembly from the rear housing to the front housing is approximately the same size as a colored lens in a traffic signal;
   means for heating the liquid crystal layer to at least a threshold minimum temperature; and
   means for selectively applying power from a power source to the heating means, wherein the means for selectively providing power to the heating means comprises:
   a first arcuate conductive bus bar on the rear surface of the heating means;
   a second arcuate conductive bus bar on the rear surface of the heating means;
   first electrical connecting means for electrically connecting the first bus bar to a first terminal of a source of electrical power;
   second electrical connecting means for electrically connecting the second bus bar to a second terminal of a source of electrical power;
   means for sensing the temperature in the vicinity of the lens assembly; and
   means for providing power to the heating means only when the temperature in the vicinity of the lens assembly is at or below a pre-determined threshold value.

2. A traffic signal comprising:
   a housing including a front opening and a gasket surrounding said front opening;
   a light source disposed in the housing; and
   a lens assembly positioned at the front opening of the housing, the lens assembly including in successive order;
   a rear transparent plate;
   a transflector including transparent color means for transmitting through the transflector as colored light any light originating from behind the transflector, and reflection means for reflecting forward any light incident to the transflector from the front of the assembly;
   a first transparent substrate positioned forward of the transflector;
   a first transparent electrode positioned on the front surface of the first substrate;
   a layer of dichroic liquid crystal material positioned forward of the first electrode, the liquid crystal layer being substantially light absorbing when in a first state and transmitting incident light when in a second state;
   a second electrode positioned forward of the liquid crystal layer;
   a second transparent substrate, wherein the second electrode is positioned on a rear surface of the second substrate;
   means for changing the liquid crystal layer from the first state to the second state by selectively applying power from a power source to the first electrode and the second electrode; and
   a front transparent plate positioned forward of the second substrate, wherein the entire lens assembly from the rear plate to the front plate is held to the housing by said gasket.

3. The lens assembly of claim 2 also comprising means for heating the liquid crystal layer to at least a threshold minimum temperature and also means for selectively applying power from a power source to the heating means.

4. The lens assembly of claim 2 wherein the first and second substrates are made of soda lime glass and further comprising a first transparent $SiO_2$ layer positioned on the front surface of the first substrate and a second transparent $SiO_2$ layer positioned on the rear surface of the second substrate.

5. The lens assembly of claim 4 also comprising a third transparent $SiO_2$ layer positioned on the front surface of the first electrode.

6. The lens assembly of claim 2 further comprising a first transparent alignment layer of methyl cellulose positioned forward of the first electrode and behind the liquid crystal layer and a second transparent alignment layer of methyl cellulose positioned forward of the liquid crystal layer and behind the second electrode.

7. The lens assembly of claim 2 also comprising a first transparent anti-reflective coating on the front surface of the second substrate, a second transparent anti-reflective coating on the rear surface of the front housing and a third anti-reflective coating on the front surface of the front housing.

8. The lens assembly of claim 2 also comprising means for sealing the liquid crystal layer between the first substrate and the second substrate.

9. The lens assembly of claim 2 further comprising means for maintaining a fixed distance between the first electrode and the second electrode.

10. The lens assembly of claim 2 wherein the front housing and the rear housing are each in the shape of a disk, and the front housing is concentric to, and of a smaller diameter than, the rear housing.

11. The lens assembly of claim 2 wherein a central portion of the front housing is cut away, thereby exposing the front surface of the second substrate directly to an observer.

12. The lens assembly of claim 2, wherein the front surface of the front housing is arcuate.

13. The lens assembly of claim 3 wherein the means for selectively providing power to the heating means comprises:
- a first arcuate conductive bus bar on the rear surface of the heating means;
- a second arcuate conductive bus bar on the rear surface of the heating means;
- first electrical connecting means for electrically connecting the first bus bar to a first terminal of a source of electrical power;
- second electrical connecting means for electrically connecting the second bus bar to a second terminal of a source of electrical power;
- means for sensing the temperature in the vicinity of the lens assembly; and
- means for providing power to the heating means only when the temperature in the vicinity of the lens assembly is at or below a pre-determined threshold value.

14. The lens assembly of claim 2 wherein the means for selectively providing power to the first electrode and the second electrode comprises:
- means for electrically connecting the first electrode to a first terminal of a source of electrical power; and
- means for electrically connecting the second electrode to a second terminal source of electrical power.

15. The lens assembly of claim 2 wherein the second electrode comprises a main portion and a subsidiary portion, the main portion being electrically isolated from the subsidiary portion, and the means for selectively providing power to the first electrode and the second electrode comprises:
- means for electrically connecting the subsidiary portion of the second electrode to a first terminal of a source of electrical power;
- means for electrically connecting the main portion of the second electrode to a second terminal of a source of electrical power; and
- means for electrically connecting the subsidiary portion of the second electrode to the first electrode.

16. The lens assembly of claim 2 wherein the liquid crystal layer comprises the combination of a host nematic liquid crystal, a guest organic dye and a cholesteric dopant.

17. The lens assembly of claim 2 also comprising a UV absorbing layer deposited on the front surface of the second substrate.

18. The lens assembly of claim 2 also comprising a UV absorbing layer deposited on a surface of the front housing.

19. The lens assembly of claim 2 wherein the front housing has integral to it UV absorbing material.

* * * * *